United States Patent [19]

Weinstein

[11] Patent Number: 5,024,100

[45] Date of Patent: Jun. 18, 1991

[54] AUTOMATIC TRANSDUCER SELECTION SYSTEM FOR PRESSURE MEASUREMENT

[75] Inventor: Leonard M. Weinstein, Newport News, Va.

[73] Assignee: Dynamic Engineering, Inc., Newport News, Va.

[21] Appl. No.: 532,697

[22] Filed: Jun. 4, 1990

[51] Int. Cl.⁵ .......................... G01L 9/01; G01L 9/10; G01L 9/12

[52] U.S. Cl. ...................................... 73/756; 73/724; 73/726; 73/727; 73/728

[58] Field of Search ................. 73/756, 724, 726, 727, 73/718, 720, 721, 862.52, 747, 749, 722, 728, 736, 744, 745, 746, 754, 755, DIG. 4, 717, 723; 338/4, 42; 361/283; 336/30

[56] References Cited

U.S. PATENT DOCUMENTS

| | | | |
|---|---|---|---|
| 3,118,305 | 1/1964 | Weekes | 73/747 |
| 4,339,943 | 7/1982 | Hedrick | 73/756 |
| 4,375,243 | 3/1983 | Doll | 73/862.52 |
| 4,445,383 | 5/1984 | Binder et al. | 73/718 |
| 4,537,079 | 8/1985 | Lee | 73/747 |
| 4,776,219 | 10/1988 | Friedrich | 73/726 |

FOREIGN PATENT DOCUMENTS 2347543  4/1975  Fed. Rep. of Germany .

Primary Examiner—Donald O. Woodiel
Attorney, Agent, or Firm—Joseph Scafetta, Jr.

[57] ABSTRACT

An automatic transducer selection system for fluid pressure measurement functions by using two or more transducers with different ranges of accuracy and also by incorporating comparator circuitry which automatically selects the transducer reading nearer to full scale. An electronic signal or output from the comparator is preferably nested such that a continuous voltage is generated in accordance with the fluid pressure being measured, thus making the system appear to function as a single transducer with a wide range of accuracy.

7 Claims, 3 Drawing Sheets

AUTOMATIC TRANSDUCER SELECTION SYSTEM FOR PRESSURE MEASUREMENT

BACKGROUND OF THE INVENTION

1. Field of the Invention

The invention relates to measuring and testing generally and to fluid pressure measurement, in particular.

2. Description of the Related Art

There are several methods for the measurement of pressures in fluid dynamics research. One particularly useful approach employs either peizoresistive or metallic strain gauges bonded to either a silicon or a stainless steel diaphragm. With the proper compensation procedures to account for zero balance and thermal effects, these devices are very useful in the determination of fluid pressure levels in wind tunnels and other environments and also are sufficiently inexpensive to allow large numbers to be used in a research facility.

As with any other strain gauge device, there are limits to the range and accuracy of this specific strain gauge installation. For example, the accuracy of these devices depends upon the minute deflection of a thin diaphragm with a strain gauge installed on its surface. The application of pressure to this diaphragm causes it to deflect, thus introducing in the surface a strain which is detected by the strain gauge and which is also proportional to the load applied. Appropriate calibration and compensation procedures permit the applied pressure to be measured as a function of the electrical output of the strain gauge.

Range limitations occur because of the inherent restriction imposed by the applied pressure level to which the diaphragm can be exposed before exceeding either its linear response range or its ultimate stress limit, thus deforming the diaphragm and the strain gauge into a region of either nonrepeatable results or failure.

In order to obtain maximum accuracy, it is desirable to maximize the amount of deflection. In other words, it is preferable to obtain a large deflection for a small applied pressure. However, in doing so, a transducer is limited in its amount of permissible overpressure, thus limiting its range of accurate measurement.

This conflict between desired accuracy and maximum range results in users being left with a choice between very accurate transducers with a limited range of safe overpressure and less accurate transducers that can be safely exposed to a wide range of high overpressure.

One method of minimizing this problematic choice involves electronic conditioning and amplifying of the output signal using a so-called autoranging technique by which a variable gain is applied to the strain gauge output such that the final output simulates a nearly full scale reading, regardless of the applied pressure.

A major disadvantage of this method is that noise is also amplified along with the electrical signal. Furthermore, the output is still in reality the result of a small movement of the diaphragm.

Thus, the solution before undertaking most tests is to match carefully the transducer size with the pressure range expected to be encountered. Of course, this solution is not applicable to tests wherein the measured fluid pressure varies over a wide range.

SUMMARY OF THE INVENTION

Two or more pressure transducers of different ranges are used with a circuit that electronically selects the output from the transducer reading closest to full scale. Each successive transducer has a larger range than its preceding transducer. For example, a first transducer may have a scale of zero to two pounds per square inch and a second transducer may have a scale of zero to 15 pounds per square inch.

A primary feature of the invention is to have all of the pressure ports connected together in parallel so that all transducers are exposed to the same pressure. Similary, all reference ports are also connected together.

A further object of the invention is to rely on the use of a new generation of pressure transducers with strain gauges fabricated as an integral part of the diaphragm. A key advantage of these strain gauges is that they are capable of being exposed to large overpressures without damage and with a lack of any significant pressure hysteresis.

The results achieved by the invention are made possible because the strain gauges associated with this new generation of pressure transducers can be exposed to large overpressures without being damaged and with a lack of any significant pressure hysteresis.

These and other features, objects and results obtained by the invention will become more readily apparent from a review of the following brief description of the drawings and the subsequent detailed description of the preferred embodiments.

DETAILED DESCRIPTION OF THE PREFERRED EMBODIMENTS

Figure 1:
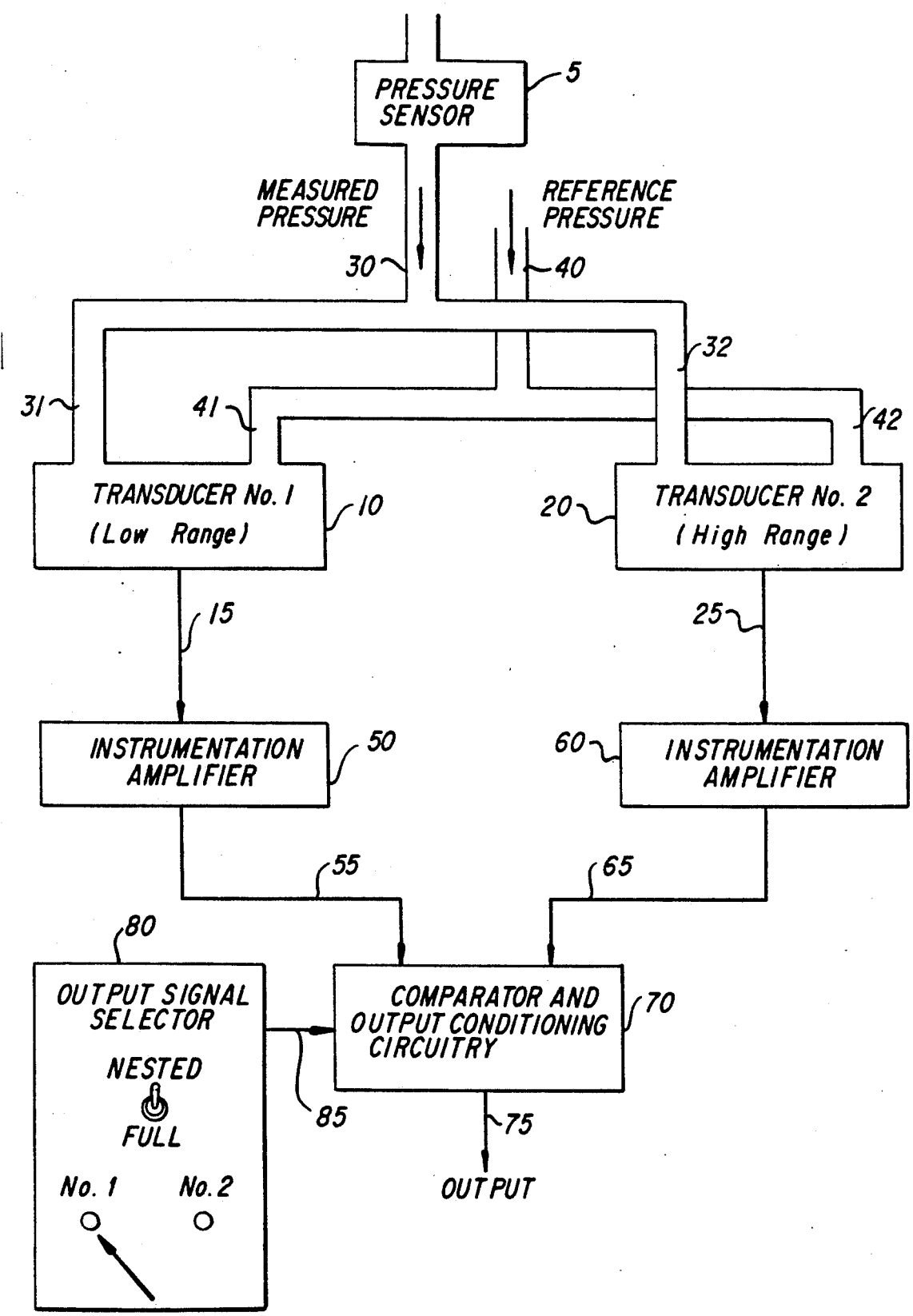
FIG. 1 is a schematic representation of a first embodiment of the invention.

A schematic representation of a first embodiment of the invention is shown in FIG. 1. Initially, a sensor 5, which may be any one of a strain gauge, a capacitive pressure sensor, or an inductive pressure sensor, measures pressure in a fluid line (not shown). A first transducer 10 is denoted in FIG. 1 as No. 1 and operates in a low pressure range of, for example, zero to two pounds per square inch. A second transducer 20 is denoted as NO. 2 and operates in a high pressure range of, for example, zero to 15 pounds per square inch. A fluid line 30 for measured pressure branches into two ports 31 and 32 leading to the transducers 10 and 20, respectively. Thus, the ports 31 and 32 are effectively connected together in parallel so that the transducers 10 and 20 are exposed to the same measured pressure. Similarly, a fluid line 40 for a reference pressure branches into two ports 41 and 42, also leading to the transducer 10 and 20, respectively; thus, the ports 41 and 42 are effectively connected together in parallel so that the transducers 10 and 20 are exposed to the same reference pressure.

This arrangement is made possible because, for example, these strain gauges can be exposed to large overpressures without being damaged. Also, this arrangement is made possible because these strain gauges can be exposed to large overpressures without undergoing any significant pressure hysteresis. In other words, subjecting the strain gauge to pressures substantially greater than the pressures of the working range of the strain gauge does not adversely affect the accuracy of the strain gauge on subsequent measurements within the working range thereof.

An electronic signal or output from the low-range transducer 10 is routed via a first electrical line 15 to a first instrumentation amplifier 50 which amplifies the low-level output in millivolts to a high-level output in the range of about one volt to five volts maximum. At the same time, an electronic signal or output from the high range transducer 20 is routed via a second electrical line 25 to a second instrumentation amplifier 60 which likewise amplifies the low-level output in millivolts to a high-level output in the same range of about one volt to five volts maximum. The amplified output from the first instrumentation amplifier 50 is then routed via a third electrical line 55 to a comparator 70. Similarly, the amplified output from the second instrumentation amplifier 60 is also routed via a fourth electrical line 65 to the comparator 70. It will be readily apparent that, while two transducers have been illustrated, additional strain gauge transducers with successively broader operative pressure ranges may be added when larger overall ranges of pressure are to be measured, each of the added transducers also furnishing an output signal which is amplified and supplied as an input to the comparator 70.

The comparator circuit 70 selects from among the various inputs the one input for which the respective pressure transducer is outputing at a level most closely approaching, but below, the full range or maximum measurable pressure level for that respective transducer and generates, from the selected input, an output signal which is transmitted via a fifth electrical line 75 to a visual display or other data recording device (not shown). In the illustrated two-transducer arrangement, the selection function may be accomplished by continuously monitoring the signal generated by one of the transducers, for example, the high-range transducer 20, to determine if the monitored signal is below or above a predetermined threshold level, such as 12% of the full range or maximum signal level corresponding to the monitored transducer, with the low-range transducer signal being selected for output signal generation when the monitored signal is below the threshold level and the high-range transducer being selected otherwise.

In order to prevent oscillation or hunting, separate threshold levels for rising and falling monitored signal levels are, preferably, employed. In a three-transducer configuration, selection of the output signal may be accomplished by a monitoring of the level of the signal generated by the intermediate-range transducer with respect to separate lower and upper threshold levels at, for example, 30% and 75%, respectively, of the full-range signal for this transducer, with the low-range transducer signal being selected when the monitored signal level is below the lower threshold, the high-range transducer signal being selected when the monitored signal level is above the upper threshold, and the intermediate-range transducer signal being selected when the monitored signal level is within the limits of the lower and upper thresholds. In a similar manner, configurations having more than three pressure transducers may employ output signal selection arrangements involving the separate monitoring of the signals from each of the intermediate-range transducers with corresponding lower and upper threshold levels.

Figure 2:
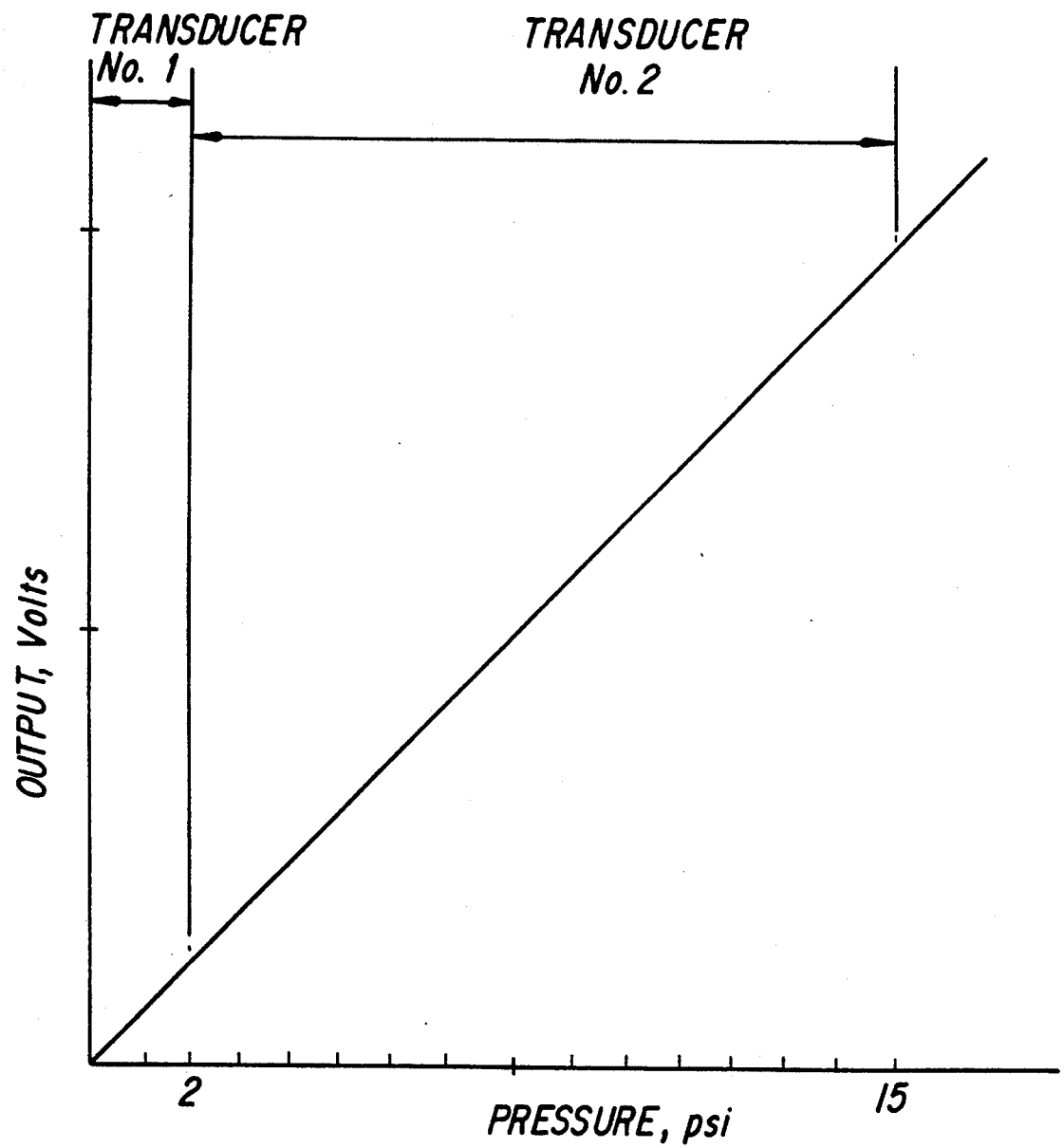
FIG. 2 is a graphical representation of the possible results obtainable by the first embodiment of the invention.

The comparator output signal over the line 75 may be "nested", as illustrated in FIG. 2, so that the output signal of the comparator circuit 70 continuously increases in voltage with increasing pressure. This nesting is accomplished by varying the gain and the offset of the comparator output generating circuit in accordance with the identity of the one transducer signal which has been selected to generate the signal over the line 75. In this mode, the output signal appears as that of a single transducer operable over the entire pressure range. As is shown in FIG. 2, the output signal is generated from the signal produced by the low-range transducer 10 when the sensed pressure is two pounds per square inch (psi) or less while the signal produced by the high-range transducer 20 is employed when the sensed pressure is above two psi.

Other forms of the output signal may be provided and, for this purpose, an output selection switch 80 is provided, communicating with the comparator 70 via a sixth electrical line 85.

Figure 3A:
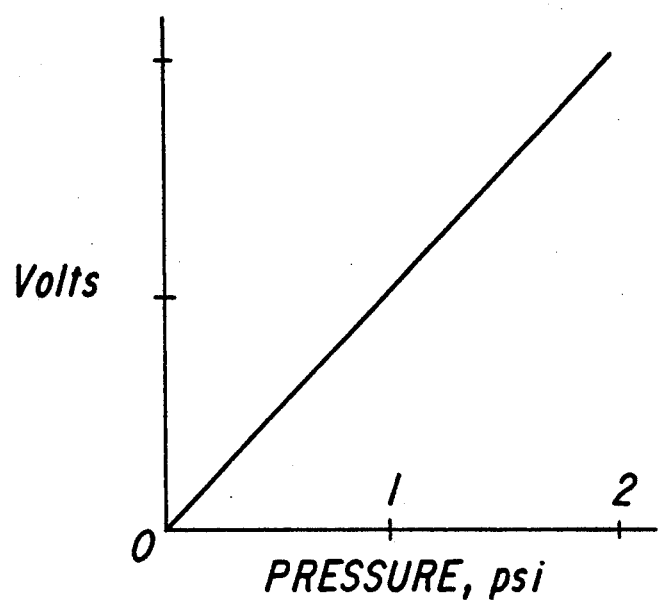
FIG. 3a is a graphical representation of the output obtainable from a first transducer used in a second embodiment of the invention.
Figure 3B:
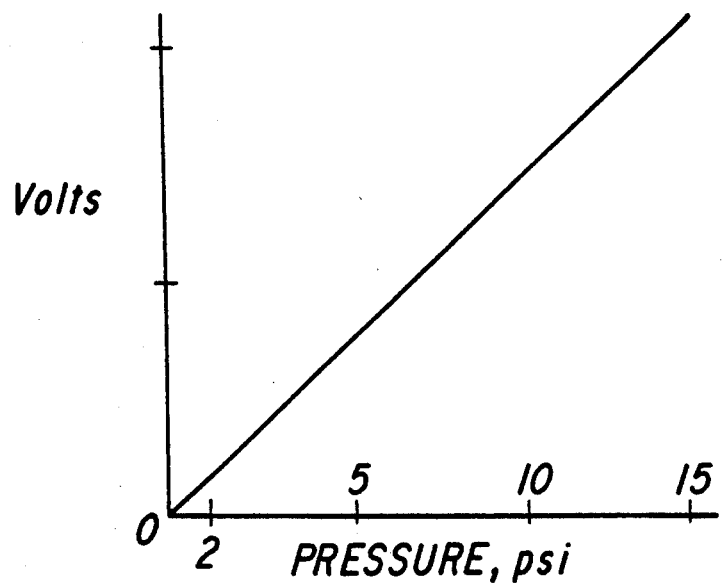
FIG. 3b is a graphical representation of the output obtainable from a second transducer used in the second embodiment of the invention.

A second output mode is shown in FIGS. 3a and 3b. In this full mode, the full-range signal of the selected pressure transducer is output without conditioning of the signal and is accompained by an identification of the selected transducer. The selection switch also provides for outputing of the signal corresponding to any one of the transducers without regard to whether this transducer is the one selected by the comparator 70.

In the two alternative embodiments discussed above, the present invention will appear as a compound transducer using either manua selection or automatic selection, but with higher accuracy over larger pressure levels than a single standard transducer subject to variable amplification.

To summarize the invention, the circuit is designed to provide output in one of two modes: first, the nested mode in which a single output signal is generated throughout the full pressure range regardless of which one of the transducers is selected as active; and second, the manually selected mode in which the user selects one of the transducers to furnish the output signal. FIG. 2 is a depiction of the output in the first nested mode while FIGS. 3a and 3b illustrate the output in the second full mode.

In regard to FIG. 2, the legend at the top indicate which one of the two transducers is active at a given pressure. Thus, when the measured pressure is below the upper limit of the low-pressure transducer No. 1, this transducer 10 is active and the output of the high-pressure transducer 20 is ignored. When the measured pressure exceeds that upper limit, the situation is reversed.

In regard to FIGS. 3a and 3b, the pressure range for each transducer is given on the abscissa of the corresponding graph. The identification of the transducer No. 1 or No. 2 is needed because, in this mode, the output signal includes both the measured pressure and an indentification of the particular transducer 10 or 20.

The present invention may also involve the organization of several units shown in FIG. 1 into one or more groups for the measurement of more than one fluid pressure at the same time. Multiplexing of the various electronic signals or outputs 75 would then be possible, thus providing the invention with a capability similar to that of either mechanically or electrically scanned fluid pressure measuring systems.

Furthermore, the automatic transducer selection system of the present invention for pressure measurement can be applied in any research enviroment where standard pressure transducers are used. The inventive system may be especially advantageously used in environments where the measured pressure varies over a wide range, such as in the measurement of fluid pressure in airfoil wakes, and in situations where a reliable estimate of the fluid pressure needed for proper transducer selection is not known beforehand.

The foregoing preferred embodiments are considered illustrative only. Numerous other modifications may readily occur to those persons skilled in electronics technology after reading this specification. Consequently, the disclosed invention is not limited by the exact construction and operation shown and described above but rather is defined by the claims appended hereto.

What I claim as my invention is the following:

1. A fluid pressure measurement system comprising:
   at least two pressure transducers having successively broader effective pressure sensing ranges, each of the strain gauges being capable of being subjected to an overpressure equal to a maximum pressure of the sensing ranges without an adverse effect therein;
   means for connecting the transducers in parallel to the fluid pressure being measured and to a reference fluid pressure; and
   comparator circuit means for receiving an output signal from each of the transducers, said circuit means functioning to select one of the transducer output signals which most closely approaches a full-range output signal of a corresponding transducer, said circuit means also functioning to generate an output signal from the selected transducer output signal.

2. The fluid pressure measurement system according to claim 1, wherein:
   said comparator circuit means includes means for conditioning the output signal therefrom in accordance with the selected one of the transducer output signals.

3. The fluid pressure measurement system according to claim 1, wherein:
   said comparator circuit means functions to generate selectively either a conditioned output signal or an output signal corresponding to the selected transducer output signal, said corresponding output signal including identification of the selected transducer.

4. The fluid pressure measurement system according to claim 3, further comprising:
   switch means for selecting an output signal from among the output signals generated by the comparator circuit means.

5. The fluid pressure measurement system according to claim 1, wherein:
   said pressure transducers are strain gauge-type transducers.

6. The fluid pressure measurement system according to claim 1, wherein:
   said pressure transducers are capacitive sensing trnsducers.

7. The fluid pressure measurement system according to claim 1, wherein:
   said pressure transducers are inductive sensing transducers.

* * * * *

UNITED STATES PATENT AND TRADEMARK OFFICE
CERTIFICATE OF CORRECTION

PATENT NO. : 5,024,100

DATED : June 18, 1991

INVENTOR(S) : Leonard M. Weinstein

It is certified that error appears in the above-identified patent and that said Letters Patent is hereby corrected as shown below:

Col. 2, line 9, change "Similary" to --Similarly--; and
            line 53, change "NO." to --No.--.

Col. 3, line 32, delete "circuit"; and
            line 34, change "outputing" to --outputting--.

Col. 4, line 6, delete "circuit";
            line 29, change "outputing" to --outputting--;
            line 34, change "manua" to --manual--;
            line 48, change "indicate" to --indicates--; and
            line 62, change "indentification" to --identification--.

Col. 5, line 5, change "enviroment" to --environment--; and
            line 25, claim 1, "strain gauges" should be --pressure
 transducers--.

Col. 6, line 31, claim 6, correct the spelling of "trnsducers" to
 --transducers--.

Signed and Sealed this

Twenty-first Day of April, 1992

Attest:

HARRY F. MANBECK, JR.

*Attesting Officer*        *Commissioner of Patents and Trademarks*